March 13, 1951     H. E. KREPS     2,544,796
FISHING LURE
Filed March 15, 1948
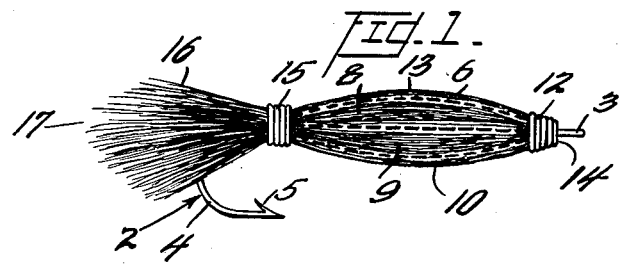
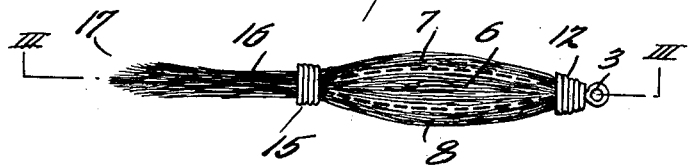
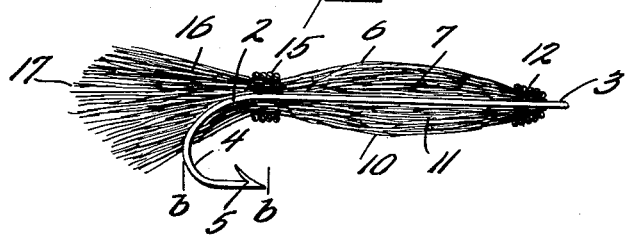
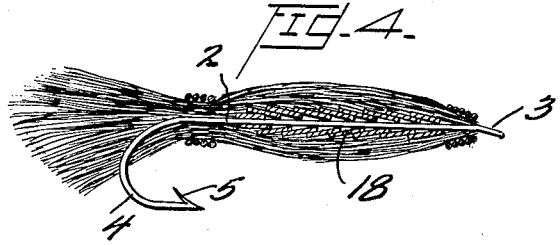
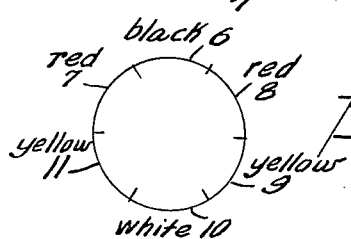
INVENTOR
*Harry E. Kreps,*
by
*Jerrold A. Bothwick*
ATTORNEY Patented Mar. 13, 1951

2,544,796

UNITED STATES PATENT OFFICE 2,544,796

FISHING LURE

Harry E. Kreps, Manor Township, Lancaster County, Pa.

Application March 15, 1948, Serial No. 14,980

2 Claims. (Cl. 43—42.25)

My invention relates to fishing lures and is directed more particularly to a fishing lure in the nature of a bait fish as distinguished from that class of lures which represent flies, hellgramites, crayfish, or any other aquatic life with antenna or feelers.

An object of my invention is to provide a lure of the bait fish type which may be made substantially wholly from hair.

Another object of my invention is to provide a lure which will have a head and body portion of confined hair and a tail portion of loose or unconfined hair firmly rooted into the body, thus providing a lifelike lure of sturdy construction.

A further object of my invention is to provide a lure in which the head, body, and tail portions are formed substantially wholly of hair with the body portion possessing light-reflecting characteristics different from those of the tail portion to enhance the lifelike appearance of the bait in the water.

Other objects of my invention will become apparent from a consideration of the following description of certain embodiments of my invention and also the appended claims.

Generally, my lure consists of a hook having disposed thereover a covering of hair, the individual strands of which are disposed generally parallel to the length of the shank of the hook. The hair is tied in place adjacent the eye of the hook, if the hook be provided with an eye, and also at a point adjacent the bill of the hook. The hair is closely confined into a mass which resembles the tapering body of a fish with a sheen characteristic of the scales of a minnow or other bait fish.

The body portion is so constructed that it resembles a bait fish, prior to and immediately upon its immersion in water; that is, it does not have to be soaked to obtain the desired morphological characteristics. Quite frequently, bait presented to a fish is struck immediately upon the bait touching the water or being submerged therein. With buck tails and other similar lures, the lure must be "worked" in water before it will have an appearance which is attractive to fish. This is not necessary with the bait of the present invention.

A relatively short and unconfined portion of hair integral with the body hair extends from the body at the point of tying adjacent the bill of the hook and flares outwardly therefrom and, being unconfined and with the individual strands spaced apart, it has a different light-reflecting quality than the body portion and provides a lifelike appearance to the tail portion of the lure.

In order that my invention may be more readily understood, I shall describe the same in conjunction with the attached drawings in which:

Figure 1 is a side elevation of a lure embodying my invention;

Figure 2 is a top plan view of the lure shown in Figure 1;

Figure 3 is a sectional view of the lure taken on the line III—III of Figure 2;

Figure 4 is a sectional view similar to Figure 3 showing a lure of modified construction, including a weighted body, and Figure 5 is a diagrammatic transverse detail of the lure of Figure 1, medially thereof.

Referring now to Figure 1 which illustrates a preferred embodiment of my invention, there is shown a long shanked hook 2 having an eye 3 and a looped or bill portion 4 which is preferably barbed at 5 as shown. While the size of the hook may vary considerably depending upon the size desired in the final lure, I have chosen a number 3 hook 6X long for illustration purposes. A snelled hook may be used, but I prefer an eyed hook with the eye lying in the same plane as the length of the shank as shown in Figures 1 and 3. The hook should be at least 6X long and may be as much as 9X long. The size of the hook will vary depending upon the size of the bait fish to be imitated, as previously mentioned. The eye may be bent out of the plane of the shank if desired, as shown in Figure 4, and a slightly different action of the lure will be obtained when drawn through the water.

The body of the lure is formed substantially entirely of hair which is preferably obtained from animal tails or bodies and which is dyed appropriate colors. The hair is placed completely around the hook as shown in the various views and is arranged in groups of predetermined colors. The disposition of the bands of different colors has been indicated by dotted lines in Figures 1 and 2 and is shown diagrammatically in Figure 5. I have found that a band of black colored hair 6, having adjacent bands 7 and 8 of red colored hair disposed on the upper half of the shank and a lower central band 10 of white hair bordered by contiguous bands of yellow colored hair 9 and 11 on the lower half of the shank provide a lure which is attractive to trout, bass, wall-eyed pike, pickerel, salmon, and allied species.

The hair is tied adjacent the eye of the hook, and it will be observed that the upper band of hair 6 tapers gradually toward the eye, being overlapped on opposite sides by the bands of hair 7 and 8 as shown diagrammatically in Figure 2 by dotted lines. The forward end is wrapped with fly tier's thread 12 formed of any one of numerous compositions, such as nylon, silk, cotton, and the like. A tapered head portion is thus provided.

It will be observed by reference to Figures 1 and 2 that the outer body of the bait is formed wholly of hair which is closely confined, with the individual strands of hair in closely spaced, abutting engagement, with the body tapering gradually from the center 13 toward both the forward or eye end 14 and the rearward or bill end where it is wrapped with fly tier's thread 15. This gradual tapering in both directions into a streamlined body with the hair closely confined is an important advance which is one of the characterizing features of my invention. It may be attained in the following manner.

The hair belt or band 6 is first applied and tied in place at the eye end 14 with winding 12 and at the bill end with winding 15. The hair band is not drawn tightly between these points of tying and as a consequence, it tends to assume an arcuate position between the points of tying. Next the belts or bands 7 and 8 are applied and similarly tied, with these bands preferably slightly overlapping the belt 6 along the length thereof and substantially completely at the points of tying as shown in Figure 1, thus providing the tapered appearance for the band 6. The bands 7 and 8, like the band 6, are not drawn tight between the points of tying and also assume arcuate positions. Next the bands 9 and 11 are applied in the same manner as the bands 7 and 8, and finally the band 10 is applied. All are formed of closely spaced strands of hair passing arcuately and unconfined between the spaced points of tying.

If the hair is not nicely arranged in a smooth, gradually tapered position, the individual strands or groups of strands which are out of place may be grasped at a point beyond the point of tying to the bill end at wrapping 15 and drawn down into proper position, or if too tightly drawn down, may be engaged at a point between the points of tying and pulled into proper position, sliding along the wrapping 15 at the bill end. After the hair has been properly positioned, a coating of adhesive such as a fly tier's cement or lacquer may be applied to the wrappings 12 and 15, thus permanently holding the hair in its curved or arcuate position.

The hair which constitutes the body portion of the lure extends beyond the winding 15 and flows out into a tail portion 16 which gradually tapers toward the tip 17 of the tail. The length of the tail portion will vary with the length of the body, but the major portion should not exceed about one-half the body length although there may be a few hairs in the tail portion which are longer. As will be observed in Figures 2 and 3, the hairs constituting the tail portion 16 are disposed in a fanlike arrangement to cover a portion of the loop or bill 4 of the hook. Substantially all of the hairs in the tail portion 16 are disposed in planes substantially parallel to the planes defined by the loop or bill portion 4 as will be clear from an examination of Figure 2. Generally also, the "feathering" of the tail should not be substantially greater than the diameter of the body at the midsection although here again there may be a few hairs so positioned. Stated in other words, the hairs constituting the tail portion 16 are disposed substantially within the boundaries of the outermost side surfaces of the body portion disposed between the bindings 12 and 15. Another feature is the provision of hair so disposed that no substantial portion of it lies above the top of the body portion. As will be observed in Figure 1, the tail portion 16 lies substantially wholly below the top portion defined by the band 6. This provides a unique lure appearance and action.

The tail portion, being formed generally of spaced strands of hair of varying length which are wholly unconfined, possesses a different light-reflecting characteristic than the body portion in which the hairs are closely spaced and confined. This is another characterizing feature of my invention.

It will be observed that the hook is directed downwardly with the bill end 4 disposed below the tail and with the point of tying at the bill end 15 lying approximately directly over the barb 5 of the hook, if the hook be barbed.

With this structure, the lure will have a soft and yielding nature and, upon being struck by a fish, will feel not unlike a live minnow as contrasted with the hard and unyielding plug type lures which are often struck by fish only to be thrust out of the mouth, apparently because of the unnatural rigid nature of the lure.

In Figure 4, I have illustrated a modification of my invention in which there is provided a weighted portion which will be effective for holding the lure below the surface of the water, particularly where it is fast moving. The weight indicated at 18 is preferably in the nature of a ribbon of lead which is wrapped over the shank of the hook throughout the length of the body portion of the lure. This positioning is desirable in order to maintain a proper balancing of the lure in use where the lure will be in a horizontal position; it should be observed that the bait must not assume a vertical position, for its lifelike action depends upon horizontal movement through the water. The weight is, of course, completely covered by the body hair.

The length of the hook, as mentioned above, should be at least 6X, and as shown in the drawings, the shank should preferably be at least three times the length of the bill of the hook, the bill length being measured from the point of the hook to the base thereof, as indicated at b—b in Figure 3.

While I have mentioned the use of dyed buck tail, other hair may be used, such as dyed squirrel, monkey, calf, buck, caribou, moose, skunk, polar bear, artificial hair, such as nylon, rayon, glass and the like, all of which are referred to in the claims as "hair."

From the foregoing, it will be clear that I have devised a lure which is streamlined in contour and will thus have a bait fish action when drawn through the water. I have also provided a body which is of a light-reflecting character different from the tail portion; the body and tail portions constituting substantially the whole of the bait. The whole of the lure is thus firmly rooted at the points of tying; the body and tail being integral. This provides a longer life for the bait and assures a better lifelike action for a longer period of time.

While I have illustrated and described certain preferred embodiments of my invention, the same may be otherwise embodied and practiced within the scope of the following claims:

I claim:

1. A fishing lure comprising a single hook of the long shank type provided with an eye at one end and a loop and barbed portion at the other end, a plurality of hairs of varying length surrounding said shank, said hairs being arranged to have the general outline of the body of a minnow, said plurality of hairs consisting of a group of hairs of one color, a second group of hairs of another color slightly overlapping the first group of hairs, and other groups of hairs of predetermined colors spaced arcuately from the first and second groups of hairs, the hairs of all groups being positioned to extend in the same general direction, a binding element embracing those ends of the hairs and shank closely adjacent to the eye, and a second binding embracing the hairs and the shank at a location where the looped portion of the hook merges into the shank portion, with some of said hairs of varying length extending beyond said second binding and being spaced apart and unconfined, said extending hairs being disposed in a fanlike arrangement to cover a portion of the loop of the hook, substantially all of the said extending hairs being disposed substantially parallel to the plane defined by the loop of the hook and substantially within the boundaries of the outermost side surfaces of the portion of said hairs disposed between said bindings, said hairs and bindings constituting the sole outer body structure of the lure.

2. A fishing lure comprising a single hook of the long shank type provided at one end with means for securing the lure to a fishing line and at the other end with a loop and barbed portion, a weight disposed about the shank of the hook for a substantial portion of the length thereof, a plurality of hairs of varying length surrounding said shank and weight, said plurality of hairs consisting of a group of hairs of one color, a second group of hairs of another color slightly overlapping the first group of hairs, and other groups of hairs of predetermined colors spaced arcuately from the first and second groups of hairs, the hairs of all groups being positioned to extend in the same general direction to have the general outline of the body of a minnow, a binding element embracing those ends of the hairs and shank closely adjacent to the end with the securing means and a second binding embracing the hairs and the shank at a location where the curved portion of the hook merges into the shank portion, with some of said hairs of varying length extending beyond said second binding, said extending hairs being disposed in a fanlike arrangement which covers a portion of the loop of the hook, substantially all of said extending hairs being disposed substantially parallel to the plane defined by the loop of the hook and substantially within the boundaries of the outermost side surfaces of the portion of said hairs disposed between said bindings, said hairs and bindings constituting the sole outer body structure of the lure.

HARRY E. KREPS.

REFERENCES CITED

The following references are of record in the file of this patent:

UNITED STATES PATENTS

| Number | Name | Date |
| --- | --- | --- |
| 1,302,102 | Tuttle | Apr. 29, 1919 |
| 1,395,533 | Tuttle | Nov. 1, 1921 |
| 1,557,083 | Peckinpaugh | Oct. 13, 1925 |
| 1,640,599 | Conn | Aug. 30, 1927 |

FOREIGN PATENTS

| Number | Country | Date |
| --- | --- | --- |
| 9,868 | Great Britain | Feb. 10, 1916 |

OTHER REFERENCES

"South Bend Bait Company," Trade Catalog No. 86, 1936, page 54.